(12) United States Patent
Dhiman et al.

(10) Patent No.: US 11,368,751 B1
(45) Date of Patent: Jun. 21, 2022

(54) SYSTEMS AND METHODS FOR DYNAMIC CONTENT RESTRICTION BASED ON A RELATIONSHIP

(71) Applicant: Rovi Guides, Inc, San Jose, CA (US)

(72) Inventors: Rohit Dhiman, Uttarakhand (IN); Vaibhav Gupta, Karnataka (IN); Ashish Gupta, Karnataka (IN); Senthil Kumar Karuppasamy, Bangalore (IN); Anil Kumar, Haryana (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/186,691

(22) Filed: Feb. 26, 2021

(51) Int. Cl.
*H04N 21/442* (2011.01)
*H04N 21/454* (2011.01)
*H04N 21/4223* (2011.01)

(52) U.S. Cl.
CPC ... *H04N 21/44218* (2013.01); *H04N 21/4223* (2013.01); *H04N 21/4542* (2013.01)

(58) Field of Classification Search
None
See application file for complete search history.

(56) References Cited

U.S. PATENT DOCUMENTS

| | | | | |
|---|---|---|---|---|
| 2009/0041311 A1* | 2/2009 | Hundley | ............ | H04N 21/4223 348/E5.096 |
| 2009/0133051 A1* | 5/2009 | Hildreth | ........... | H04N 21/42204 725/28 |
| 2011/0072452 A1* | 3/2011 | Shimy | ................ | H04N 21/4532 725/25 |
| 2012/0167123 A1* | 6/2012 | Gavita | ............... | H04N 21/4751 725/25 |
| 2013/0125154 A1* | 5/2013 | Price | .................. | H04N 21/4415 725/10 |
| 2014/0181910 A1* | 6/2014 | Fingal | ................... | H04L 63/107 726/4 |
| 2015/0070516 A1* | 3/2015 | Shoemake | ......... | H04N 21/4542 348/207.11 |
| 2016/0080510 A1* | 3/2016 | Dawoud Shenouda Dawoud | ...... | H04L 67/24 709/225 |
| 2016/0112760 A1* | 4/2016 | Kosseifi | ............. | H04N 21/4542 725/28 |
| 2018/0070123 A1* | 3/2018 | Sharma | ............ | H04N 21/41265 |
| 2018/0129514 A1* | 5/2018 | Lefevre | ..................... | G06F 3/16 |

\* cited by examiner

*Primary Examiner* — Alexander Q Huerta
(74) *Attorney, Agent, or Firm* — Haley Guiliano LLP

(57) ABSTRACT

Systems and methods are provided herein to dynamically update content restrictions for multiple users by detecting a first user in the proximity of a media device playing a first content item and detecting a second user entering the proximity of the media device. In response to detecting a second user entering the proximity of the media device and receiving a command from the first user that controls playing the first content, the system modifies a stored relationship between the first user and the second user to track the relationship between the first user and the second user. Thereafter, when the system detects the first user and the second user in the proximity of a media device playing a second content, in response, the system automatically performs an action that controls the playing of the second content (e.g., without user having to issue those commands).

19 Claims, 8 Drawing Sheets

200

Dynamic Viewer Control

Individual Limits — 202

|  | Name | Individual limit |
|---|---|---|
| First User | Eddie | No Limit |
| Second User | Buddy | No Limit |
| Third User | Elaine | No Limit |
| Fourth User | Steven | PG-13 |

Multi-users Limits — 204

| Controlling remote | Entering proximity | Combined limit | Content type |
|---|---|---|---|
| 1st User | 2nd User | Rated R. | Sexually-oriented Nudity |
| 1st User | 3rd User | No Limit |  |
| 2nd User | 1st User | No Limit |  |
| 2nd User | 3rd User | No Limit |  |
| 3rd User | 1st User | PG-13 | Language, Adult Activities or other Elements |
| 3rd User | 2nd User | PG-13 | Sexually-oriented Nudity |
| 3rd User | Additional User Similar to 2nd User | PG-13 | Sexually-oriented Nudity |

XPERI

Database of Control Actions

Multi-users Limits — 302

| Controlling remote | Entering proximity | Control command | Predicted control action | Confidence (%) |
|---|---|---|---|---|
| 1st User | 2nd User | Change Channel | Change Channel | 75 |
| 1st User | 3rd User | None | None | 100 |
| 2nd User | 1st User | None | None | 100 |
| 2nd User | 3rd User | None | None | 100 |
| 3rd User | 1st User | Mute Volume | Mute Volume | 50 |
| 3rd User | 2nd User | Prompt for Commercial | Prompt for Commercial | 100 |
| 3rd User | Additional User Similar to 2nd User | None | Prompt for Commercial | 50 |

XPERI

FIG. 3

SYSTEMS AND METHODS FOR DYNAMIC CONTENT RESTRICTION BASED ON A RELATIONSHIP

BACKGROUND

The present disclosure generally relates to systems and methods for providing dynamic content restrictions based on relationships and, more particularly, systems and methods for developing a database of content restrictions based on a relationship between multiple users.

SUMMARY

In one approach, parental control systems are designed on a per-user basis. That is, a parental control system may be configured to allow or prohibit display of content based on the setting for each individual user. In another approach, when multiple users are present, the system will simply use the setting associated with the most restricted user. For example, if an adult and a child are present, the system may simply default to using the parental control setting associated with the child. This approach prevents content from being presented to a user, for whom presentation of the content would violate the user's authorization level settings; however, this approach does not account for relationship between the users. For example, two users may both be individually authorized to view certain content on their own but may not be comfortable consuming (e.g., watching) that content together (e.g., a teen may be uncomfortable watching suggestive content with his grandmother).

A system described above would not account for this and would allow such content to be played, since a parental control policy is not violated for each individual user. Accordingly, the content enjoyment of other users in the room is negatively impacted. Worse, a user in such a situation may issue control actions (e.g., switching channel, lowering the volume), causing unnecessary functions to be performed and decreasing system performance when playing a media asset.

Accordingly, to solve this problem, methods and systems are provided to dynamically update content restrictions based on a relationship of multiple users. In some embodiments, methods and systems are provided to dynamically update content restrictions for multiple users by detecting a first user in the proximity of a media device playing the first content. For example, a first user is watching a movie (e.g., "Basic Instinct") with an "R" rating based on the rating system of the Motion Picture Association of America, with sexually oriented nudity. As the first user is viewing the first movie, a second user (e.g., sister, mother, grandfather, coworker, etc.) enters the proximity of the media device playing the first content. Upon the second user entering the room, the system receives a command from the first user that controls playing the first content ("Basic Instinct"). In some embodiments, the command that controls playing the first content may be muting a volume of the media device playing the first content, lowering the volume of the media device playing the first content, or changing a channel of the media device playing the first content. Based on the received command, the system then modifies a stored relationship between the first user and the second user to track the relationship between the first user and the second user. For example, the system modifies the stored relationship with the data related to the command performed and what content the first user was viewing. In some embodiments, when the system subsequently detects the first user and the second user in the proximity of the media device playing a second content item, in response, the system automatically performs an action that controls the playing of the second content item (e.g., without a user having to issue the command). In some embodiments, the action may correspond to the command received before, from the first user, or it may be another action. In some embodiments, the system selects the action based on the stored relationship status that tracks the relationship between the first user and the second user. This avoids unnecessary functions to be performed by the user, thereby improving content enjoyment of all users in the room by performing the control actions automatically, based on users' relationships and not merely based on individuals' settings.

In some embodiments, the system may perform the action that controls the playing of the second content item by automatically performing the same command that was used previously (i.e., without a user having to issue the command). For example, the received command and the automatic action performed by the system may be the same action, one that is selected from muting a volume of the media device playing the first content, lowering the volume of the media device playing the first content, and changing a channel of the media device playing the first content that the first user entered. In some embodiments, the system may perform the action that controls the playing of the second content item by automatically performing a different command than was used previously. For example, the system may insert an advertisement into the presentation of the second content item. In some embodiments, the system may perform a different command, for example, it may play a version of the second content item that is one authorization level below the current authorization. For example, while playing the R-rated version of a movie, the system may search and replace the R-rated version with a PG-13 rated version upon the second user entering the proximity of the device. In another embodiment, the system may detect that the second user is no longer in the proximity of the device.

In some embodiments, the system may perform the action without receiving the command from the first user to perform the command. For example, in response to the second user entering the proximity of the media device, the system performs the action without receiving the command from the first user to perform the command. An aspect of this embodiment, the system does not perform the action when only one of the users is in the proximity of the media device. For example, the action that controls the playing of the second content item is not performed when just one user of the first user and the second user is in the proximity of the media device but is performed when both the first user and the second user are detected in the proximity of the media device.

In some embodiments, the system may modify the stored relationship status between the first user and the second user by retrieving existing relationship data between the first user and the second user based on a first user profile associated with the first user and a second user profile associated with the second user. In an aspect of this embodiment, the existing relationship data may be obtained from an existing parental control. In another aspect of this embodiment, the respective user profile data may be obtained from a social media database (e.g., Facebook®, Twitter®, etc.). For example, the system may create a combined profile that includes both users (e.g., first user and second user) and indicates the restriction level based on ratings and the control actions to perform. For example, as a first user is watching "Basic Instinct" and his grandmother walks into the room, the first user may feel awkward or embarrassed to watch the movie with his grandmother and, as a result, the first user may change the channel to a different program. Based on this action by the first user, the system may modify the stored relationship, tracking to perform an action every time the first user (e.g., grandson) and the second user (e.g., grandmother) are together in a room and certain content is playing. In some embodiments, the instruction to perform the action is based on the rating of the content. In some embodiments, the instruction to perform the action is based on the rating and a category of the content. For example, restricted categories may include adult themes, adult activity, hard language, intense or persistent violence, sexually oriented nudity, drug abuse or other elements.

In some embodiments, the system may identify a type of a social link between the first user and the second user based on a respective user profile. For example, the system may determine that the first user and the second user are related, coworkers or friends. In some aspects of this embodiment, the system may determine that the second user may be a parent, a sibling, a grandparent, a cousin, an uncle, an aunt, a child, a friend, and a coworker of the first user. In some embodiments, upon identifying a type of a social link between the first user and the second user, the system may by triggered by the same type of a social link with a third user to automatically perform a control action. Further, the system may identify an age difference between the first user and the second user. In some embodiments, upon identifying the type of the social link and the age difference, the system may modify the stored relationship data based on the type of the social link, the age difference and the received user command that controls playing the first content.

In some embodiments, the type of a social link may be based on gender. For example, the first user may be a male coworker, and the second user may be a female coworker. In yet another embodiments, the system may identify an age difference between the first user and the second user based on the respective user profiles. In some embodiments, upon identifying the type of the social link (e.g., gender) and the age difference (e.g., greater than 20 years), the system may modify the existing relationship data based on the received user command that controls playing the first content. In some embodiments, the system may employ an age difference as the sole criterion to determine where to automatically (i.e., without a user having to issue the command) perform an action that controls the second content's playing. In some embodiments, the system may employ the type of social link (e.g., gender) and the age difference (e.g., greater than 20 years) for deciding whether to perform the control actions when a third user enters the proximity of the media device. In some embodiments, based on the age difference exceeding an age difference threshold (e.g., 20, 30 or 40 years or another preselected age difference) between the first user and the third user, or the second user and the third user, the system may perform the control actions when a third user enters the proximity of the media device.

In some embodiments, the system further identifies a user action that indicates disengagement from the playing of the first content. For example, in response to the second user entering the proximity of the media device, the first user leaves the proximity of the media device playing the first content, the first user engages with a second device or the first user looks away from the media device playing the first content for an extended period. In some embodiments, the media device may include a camera system to identify each user and their actions. In some embodiments, the system may use the camera system to capture the first user's actions.

For example, the camera system may capture that the user looks away from the media device playing the first content for an extended period. Upon identifying the user action that indicates disengagement from the playing of the first content after the second user enters the media device's proximity, the system modifies the stored relationship status that tracks the relationship between the first user and the second user.

In some embodiments, the system receives the command that controls playing the first content within a threshold time period of the second user entering the proximity of the media device. For example, the system receives the command within 5 seconds, 3 seconds or 1 second of the second user entering the proximity of the media device.

In some embodiments, the system detects the second user entering the proximity of the media device by determining a location of a mobile device associated with the respective user, performing a camera scan using facial recognition, or listening to a voice using voice recognition. In some embodiments, the system detects an additional, third user entering the proximity of the media device. In some embodiments, the system identifies the command that controls playing the first content performed by the first user in response to the additional user entering the proximity of the media device and modifies a stored relationship status that tracks the relationship between the first user, the second user and the additional user. For example, the system modifies the stored relationship status based on all three users being within the proximity of the device and the rating or category of the content fro which the first user performed the command.

In some embodiments, the system may identify a pattern in the stored relationship status between the first user and the second user based on receiving the command that controls playing the first content when the first user and the second user are both present. In some embodiments, the system may detect a third user who has a relationship with the first user similar to that of the the second user and the first user entering the proximity of the media device playing the first content, and modifies a stored relationship status that tracks the relationship between the first user and the third user. In some embodiments, the system detects the first user and the third user in the proximity of the media device playing the first content and automatically performs the command that controls the playing of the second content item, wherein the command is selected based on the stored relationship status that tracks the relationship between the first user and the third user.

BRIEF DESCRIPTION OF THE DRAWINGS

The above and other objects, advantages, and improvements of the disclosure will be apparent upon consideration of the following detailed description, taken in conjunction with the accompanying drawings, in which like reference characters refer to like parts throughout, and in which:

FIG. 2 depicts an illustrative example of a database for individual parental controls and relationship-based viewer control, in accordance with some embodiments of the present disclosure;

FIG. 3 depicts an illustrative example of a database of control actions based on relationships, in accordance with some embodiments of the present disclosure;

DETAILED DESCRIPTION

Figure 1:
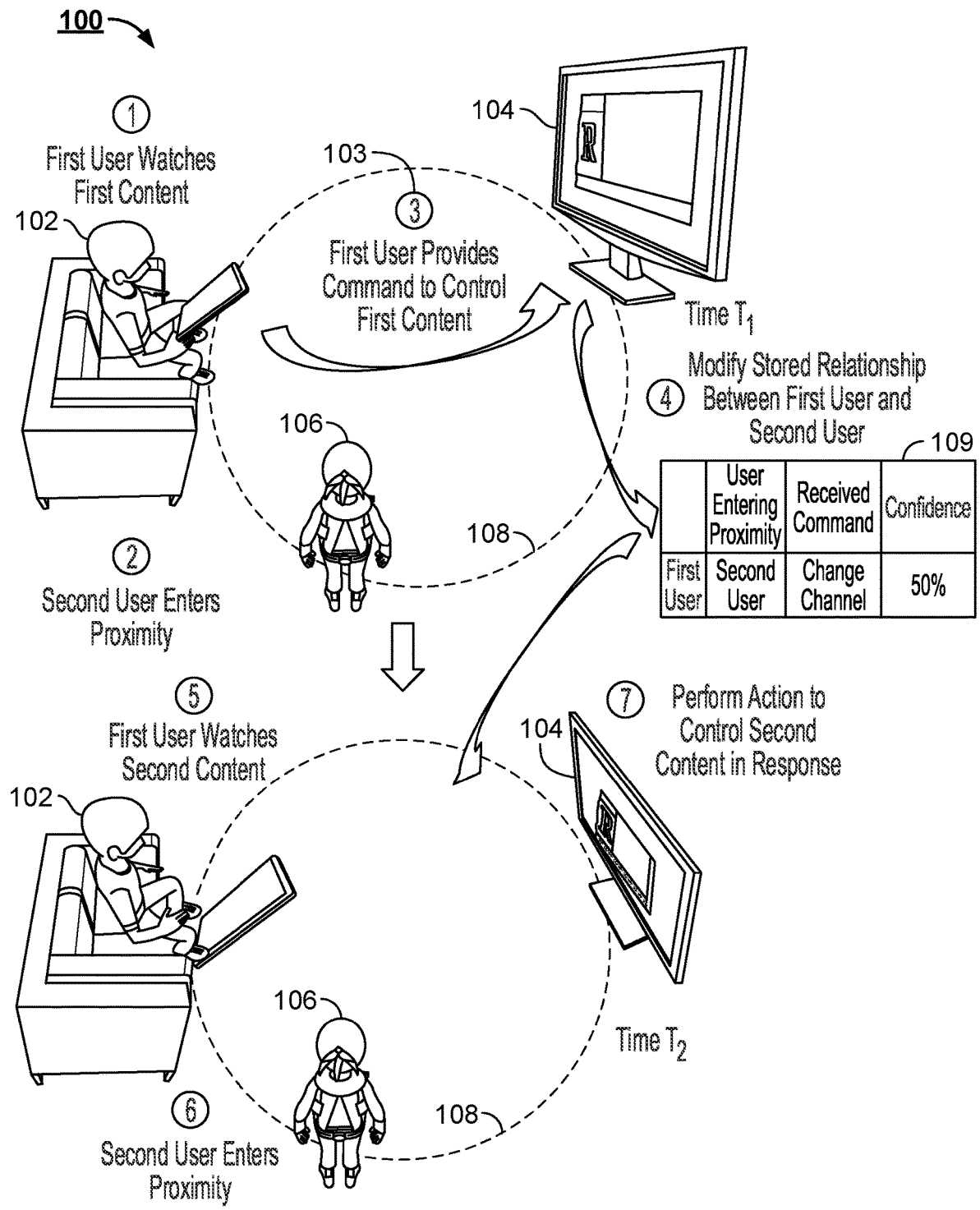
FIG. 1 shows an illustrative example of a scenario for modifying a stored relationship status based on a relationship and user feedback and, at another time, automatically performing actions that control the playing of certain content, in accordance with some embodiments of the present disclosure.

FIG. 1 shows an illustrative example of a scenario for modifying a stored relationship status based on a relationship and user feedback and automatically performing actions (i.e., without user issuing those commands) that control the playing of the content, in accordance with some embodiments of the present disclosure. For example, a first user, a 20-year-old adult consumes content on a TV in a room. The content may include are R-rated and PG-13 rated segments (e.g., "Titanic"). A second user (e.g., grandma) enters the room (e.g., proximity of the media device). In response to grandma entering the room, the first user enters a command (e.g., change channel, change program, reduce volume, mute volume, etc.). The system updates a relationship between the first user (e.g., adult) and second user (e.g., grandma) and the content restriction. At a subsequent time, when the first user is consuming a second content item containing R-rated segments and the second user enters the room (e.g., proximity of the media device), the system performs a control action (e.g., change channel, change program, reduce volume, mute volume, etc.) automatically (i.e., without user issuing those commands).

Returning to FIG. 1, as shown in step 1, at time $t_1$, a first user 102 (e.g., adult) consumes (e.g., watches, listens to) first content (R-rated movie) on a computing device 104 in a proximity 108 of the media device (e.g., the room where the first user 102 watches the first content). For example, the first content may be output by a computing device 104 including a speaker connected to/integrated with the computing device 104. Although the computing device 104 is shown as a display device (e.g., a TV), the computing device 104 may be any user equipment with or without a display (e.g., a set-top box, a stereo, a laptop, or any other suitable output device). In some embodiments, if the computing device 104 is a display device, the computing device 104 may play media content having a video portion and an audio portion (e.g., a movie).

While the first content is playing, a media device (e.g., the computing device 104) may monitor the proximity 108 of the media device for a change in the number of users in the proximity 108 of the media device. In some embodiments, a media device (e.g., the computing device 104) may detect, at step 2, a second user (e.g., grandma) entering the proximity of the media device 108. For example, the media device may monitor the proximity 108 of the media device using a camera in the computing device 104 and/or cameras in other user equipment (e.g., a TV, a smart home hub, the speaker connected to the computing device 104, or any other device in the proximity 108 of the media device). However, this is only one example, and the media device may use any other suitable hardware/techniques to detect users in the proximity 108 of the media device. For example, the media device may detect users directly (e.g., by using imaging, radar, etc.) or indirectly (e.g., by detecting devices associated with the users). In some embodiments, the media device may also monitor the proximity 108 of the media device for background noise (e.g., by using a microphone in the user's equipment in the proximity 108 of the media device).

At step 3, while the first content is playing, in response to detecting a second user (e.g., grandma) entering the proximity 108 of the media device (e.g., entering room), the media device may receive 103 from a device (e.g., a remote, smartphone, etc.) associated with the first user a command 103 (e.g., change channel, change program, reduce volume, mute volume, etc.) that controls playing the first content. The received command may be to mute a volume of the media device playing the first content, lower the volume of the media device playing the first content, or change a channel of the media device playing the first content. In step 4, in response to receiving the command (e.g., change channel, change program, reduce volume, mute volume, etc.), the media device may modify a stored relationship 109 between the first user 102 and the second user 106. In some embodiments, instead of receiving a command, the media device may detect a user action that indicates disengagement from the playing of the first content. For example, the user actions that indicate disengagement may be any one or more of the user turning their face away from the media device, focusing on a second media device, leaving the room (e.g., leaving the proximity of the media device) or any combination thereof. In some embodiments, the media device may receive a command and then a user action that indicates disengagement from the playing of the first content. The device may use existing individual parental controls associated with the respective users to modify a combined authorization limit. For example, the device may update the relationship with the first user, the second user, the content being consumed and the received command.

In some embodiments, the stored relationship between the first user (e.g., adult) and the second user (e.g., grandma) may be stored in a user profile associated with one of the users or in the profiles of all of the users in the proximity of the media device 108. In some embodiments, the stored relationship between the first user and the second user, including a received command, may be one of a plurality of stored relationship between the first user and the second user, including a received command, each associated with different commands and different content in the proximity 108 of media device.

At step 5, the media device may subsequently detect a first user (e.g., adult) consuming a second content, e.g., on the same or different device. At step 6, the media device may detect a second user (e.g., grandma) in the proximity of the media device 108. For example, as shown, at time $t_2$, the media device may detect second user 106 enter the proximity of media device 108 while a second content item is being played. In some embodiments, the media device may maintain a table of the users in the proximity of media device 108 and update the table when a user enters or leaves the proximity of media device 108.

Based on the stored relationship status 109, the media device may automatically perform actions to control the playing of the second content item without a user request for those actions. For example, as shown in FIGS. 2 and 3, when a relationship is modified with a command, the action to control the playing of content corresponding to the command may be automatically performed. For example, the media device may automatically perform an action to decrease the output volume by six (i.e., from "volume 14" to "volume 8"), change the channel to another channel or program, play a commercial, insert a lower-rated version or a combination thereof. In some embodiments, the media device may further adjust the audio content's output volume based on other factors (e.g., background noise in the proximity of the media device 108, a change in the background noise, etc.). For example, the media device may further adjust the output volume to compensate for an increased or decreased level of background noise. In some embodiments, a commercial that is retrieved from the memory may be inserted into the presentation of the content. In some embodiments, the commercial provides a delay between switching from a R-rated version of a content to a PG-13 rated version of the same content. The control actions are performed on content that each of the users may individually consume but when together may not consume. When one of the users in the proximity of the media device leaves and only one user remains in the proximity of the media device, the actions to control the playing of the content may be reversed (e.g., volume increased to original volume, return to original channel).

The media device may receive a command 103 to control the playing of content from a user in the proximity of media device 108. For example, the media device may receive a command to control the playing of content 103 from the first user 102 to decrease the volume or to change the channel automatically. The media device may receive a command to control the playing of content 103 through a user interface (e.g., a remote control).

The media device may determine if the command to control the playing of content 103 is received within a predetermined time after the second user enters the proximity 108 of the media device. In some embodiments, each command received also includes a confidence score that correlates to the user's intentions. The confidence score may be derived based on the latency of the command after the second user enters the proximity as well as the repetition of the command. The higher the confidence score for each command, the faster the media device may perform the actions that control playing the second content. A delayed command may not occur in response to the second user entering the proximity of the media device but for some other reason. For example, a first user entering a command within a first threshold (e.g., 1 second) of the second user entering the proximity of the media device may correlate to a high confidence score, while a command within a second threshold (e.g., 5 seconds) may correlate to low confidence. On the other hand, a command received after 10 seconds may not be in response to the second user entering the proximity. Further, the repetition of the command may increase the confidence score. For example, if the user entered the command multiple times, that will also increase the confidence score. In some embodiments, the command may be associated to scenes of the movie, for example, "Titanic" includes R-rated scenes and PG-13 rated scenes. In this example, each time an R-rated scene is consumed, the first user enters a command. Such repetition of command will increase the confidence score. In some embodiments, in response to the user not performing an action, the system may cause the control circuitry to update the stored relationship status to indicate that no limitations are present. Non-action by the user may also lead to a confidence score, which is correlated to the repetition of said non-action.

In some embodiments, the media device may record the time when the command to control the playing of content 103 is received. If the media device determines that the command to control the playing of content 103 is received within the predetermined time after the second user enters the proximity of the media device (e.g., 1 second, 2 seconds, etc.), the media device may infer that the first user 102 may feel awkward or embarrassed to watch the movie with the second user and may modify the stored relationship status 109. The predetermined time may correspond to an average time it takes a user to enter a command to change the channel or mute the volume (e.g., 2 seconds). In some embodiments, the predetermined time may be adjusted based on user behavior (e.g., by determining the time it normally takes for the particular user to perform a command).

In some embodiments, the computing device 104 may output a notification (e.g., a visual notification) to inform the first user that the action to control the second content item has been automatically performed based on detecting a first user and second user in the proximity of the media device 108. An example of the notification may be a message the media device provides when grandma enters the proximity "we have changed a setting preference for you and grandma." In some embodiments, the computing device may output a notification on a second device associated with the first user, for example, a text message that the second content item being consumed has been altered (e.g., reduced from R-rated to PG-13 rated) in response to grandma entering the room. In some embodiments, the notifications output to the first user's device may prompt for user feedback (e.g., "Your grandma is in the room, do you want to change the channel?").

FIG. 2 depicts an illustrative example of a database for individual parental controls and relationship-based viewer control, in accordance with some embodiments of the present disclosure. A media device maintains the database shown in FIG. 2. The database from FIG. 2 is a dynamic viewer control for individual users with individual limits and multiple users with combined limits. Each of the individual limits 202 includes identifiers (e.g., first user, second user, third user, etc.), a name of the user and the individual limit associated with particular users (e.g., no limit or PG-13). For example, the first user profile includes the name "Eddie" and is associated with an individual limit of "No limit." In some embodiments, each of the individual limit restrictions may be stored in a user profile associated with a particular user. As shown, the multi-user limits 204 are profiles based on more than one user being in proximity of the media device. For example, a relationship profile is associated with two or more particular users. In some embodiments, in the event that the identity of a user in the proximity of media device 108 cannot be determined, no control actions may be saved. In some embodiments, in the event that the identity of a user in the proximity of media device 108 cannot be determined, the media device may prompt the unidentified user to log in to their user profile or to create a user profile. In some embodiments, the media device may automatically generate a new user profile for the unidentified user and associate a received command to control the media device playing the first content with the new user profile. In some embodiments, the media device includes a machine learning feature that adapts to the users to learn about the relationships and repeats functions, thereby improving the enjoyment of the users' content consumption.

In some embodiments, the multi-user limits 204 may be determined in advance (e.g., preset by the media device), based on characteristics in each of the users' profiles (e.g., age, social link, gender, etc.), for example, a rule that would limit the content based on a demographic with an age gap to avoid risqué scenes. The age gap may be manually set to 10, 20, 30 years, or some other value. As shown, the combined limit of each relationship profile 204 may be adjusted to additional users. In some embodiments, for each additional user in the proximity of the media device, a new multi-user limit is created. As shown, the multi-user limit varies from the individual limit based on the commands received. For example, based on a second user entering the proximity of the media device, the media device may update the combined limit in response to receiving commands. In some embodiments, the updated combined limit may further be based on the particular scene. For example, if a sexually oriented nudity scene is displayed while the second user enters the proximity, the media device may update the profile based on the received command from the first user. In some embodiments, the command to control the media device playing the first content may be received in response to a segment of the content being presented. For example, with no restrictions, a sexually oriented nudity scene comes on, and a command is received. Based on receiving the command, a relationship profile for a first user and a second user in the proximity of the media device is modified to include data about the command.

As shown in FIG. 2, the combined limit of each relationship profile 204 may vary based on each user's preference. For example, each of the first user and third user from the individual limits 202 database of the media device has no individual limits, i.e., they can consume any content with no restrictions individually. As shown in the combined limit for both the first user and third user in the multi-user limit 204, when the first user (e.g., parent) is consuming content and the third user (e.g., an adult child) enters, no additional restrictions are employed. However, when the third user (e.g., adult child) is consuming content and the first user (e.g., parent) enters, the restrictions are reduced to PG-13. The content is further limited by the language, adult activities and other elements. Similarly, when the third user (e.g., adult child) is consuming content and the second user (e.g., grandma) enters, the restrictions are reduced to PG-13. The content is further limited by the sexually oriented nudity. The system may determine a social link between the third user and the second user and may apply the same restrictions to another user with a similar social link, for example, identifying a social link between the third user and the second user of a grandchild to grandmother, respectively. Based on the observed social link, another user, e.g., a second grandmother, may have similar restrictions applied. In some embodiments, the content type may be the reason a user is uncomfortable consuming the content with the second user, and the combined restriction may be based solely on the content type.

FIG. 3 depicts an illustrative example of a database of control actions based on relationships, in accordance with some embodiments of the present disclosure. A media device maintains the database shown in FIG. 3. As shown, the database from FIG. 3 shows multi-user limits 302 that are based on profiles based on more than one user being in proximity of the media device. For example, a relationship profile is associated with two or more particular users. As shown, the database may track the users, a received command, a confidence score for each multi-user limit and a predicted control action.

In some embodiments, the control command that is received and the predicted control action are the same actions. For example, if the user enters a command to change the channel, the predicted action is also to change the channel. In some embodiments, the control action is different from the command received. Further, a confidence percent is developed over the course of a number of received commands and is based on repetition. As the user continues to enter a particular command each time a second user enters the media device's proximity, the media device increases the confidence score. For example, for each command that the user enters in response to the second user entering proximity or a scene triggering a command, the confidence profile may increase 25%, 33% or some other value. In some embodiments, the confidence of the command has to eclipse a certain threshold for the media device to perform the action automatically. For example, a confidence score of greater than 50% or 75% or some other preset value may cause control actions to be automatically performed. In some embodiments, the user's commands or lack of commands may reset the confidence score or reduce the confidence score for the command. For example, in response to the first user not providing a command after the second user enters the room, the previous commands may be reset. In another example, the restrictions may be narrowed to the specific content type. For example, if previously commands were received for R-rated content, and a subsequent R-rated content does not receive a command, then the restrictions may be based on a more specific content type, for example, a content type limited to one or more of the following content types: adult themes, adult activity, hard language, intense or persistent violence, sexually oriented nudity, drug abuse or other elements or a combination thereof.

As shown in FIG. 3, the media device stores in memory instruction for tracking and performing control actions based on the relationship profiles between multiple users. In some embodiments, the media device monitors the control commands received and updates the stored relationship status with the control commands. Based on the control commands, the media device may predict the control action to perform automatically based on the confidence score. For example, a first user may enter a change channel command for each time a second user enters the room, and in response, the system may predict a control action to change the channel the next time the second user enters the room and the same content type is being consumed. In some embodiments, the predicted control action may be different from the received command. For example, a command is obtained each time the second user enters the room, but the command varies. In such an example, the control action may be randomly selected, or a most conservative control action may be employed. The most conservative action may be when the video and audio are changed upon the second user entering the room.

In some embodiments, the system may determine a social link between the third user and the second user and may apply the same restrictions to another user with a similar social link, for example, identifying a social link between the third user and the second user of a grandchild to grandmother, respectively, with a predicted control action and a confidence score of 100. Based on the observed social link, another user, e.g., a second grandmother, may have similar restrictions applied with the same predicted control actions and a reduced confidence score. In some embodiments, in response to performing the control action and the user not correcting the automatically performed action, the confidence score is increased.

Figure 4:
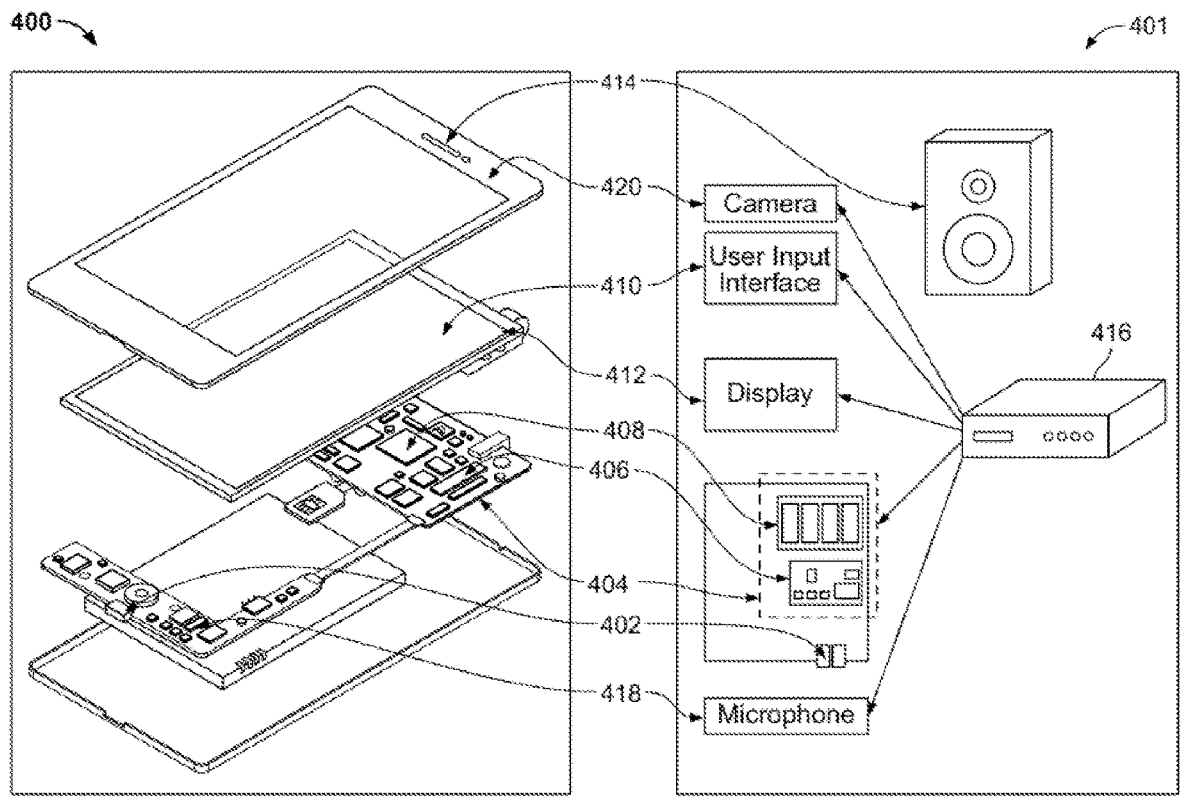
FIG. 4 depicts exemplary devices and related hardware for modifying a stored relationship status based on a relationship and user feedback and subsequently automatically performing actions that control the playing of certain content, in accordance with some embodiments of the present disclosure.

FIG. 4 describes exemplary devices and related hardware for modifying a stored relationship status based on a relationship and user feedback and automatically performing actions that control the playing of the content, in accordance with some embodiments of the present disclosure. FIG. 4 shows generalized embodiments of illustrative user equipment devices 400 and 401. For example, user equipment device 400 may be a smartphone device. In another example, user equipment system 401 may be a user television equipment system (e.g., the computing device 106). In yet another example, the user equipment system 401 may be a media device. The user television equipment system 401 may include a set-top box 416. The set-top box 416 may be communicatively connected to a camera 420, a microphone 418, a speaker 414, and a display 412. In some embodiments, the camera may detect users in the media presentation environment (i.e., the proximity of the media device). In some embodiments, the microphone 418 may detect sound (e.g., background noise) in the media presentation environment. In some embodiments, the display 412 may be a television display or a computer display (i.e., the proximity of the media device). In some embodiments, the set-top box 416 may be communicatively connected to a user input interface 410. In some embodiments, the user input interface 410 may be a remote-control device (e.g., the remote control). The set-top box 416 may include one or more circuit boards. In some embodiments, the circuit boards may include processing circuitry, control circuitry, and storage (e.g., RAM, ROM, hard disk, removable disk, etc.). In some embodiments, the circuit boards may include an input/output path. More specific implementations of user equipment devices are discussed below in connection with FIG. 6. Each one of the user equipment device 400 and the user equipment system 401 may receive content and data via input/output (I/O) path 402. The I/O path 402 may provide content (e.g., broadcast programming, on-demand programming, Internet content, content available over a local area network (LAN) or wide area network (WAN), and/or other content) and data to control circuitry 404, which includes processing circuitry 406 and a storage 408. The control circuitry 404 may be used to send and receive commands, requests, and other suitable data using the I/O path 402. The I/O path 402 may connect the control circuitry 404 (and specifically the processing circuitry 406) to one or more communications paths (described below). I/O functions may be provided by one or more of these communications paths, but are shown as a single path in FIG. 4 to avoid overcomplicating the drawing.

The control circuitry 404 may be based on any suitable processing circuitry, such as the processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 404 executes instructions for a media device stored in memory (i.e., the storage 408). Specifically, the control circuitry 404 may be instructed by the media device to perform the functions discussed above and below. In some implementations, any action performed by the control circuitry 404 may be based on instructions received from the media device.

In client/server-based embodiments, the control circuitry 404 may include communications circuitry suitable for communicating with a media device server or other networks or servers. The instructions for carrying out the above-mentioned functionality may be stored on a server (which is described in more detail in connection with FIG. 5). Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communication networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as the storage 408 that is part of the control circuitry 404. As referred to herein, the phrase "electronic storage device" or "storage device" should be understood to mean any device for storing electronic data, computer software, or firmware, such as random-access memory, read-only memory, hard drives, optical drives, digital video recorders (DVRs, sometimes called personal video recorders, or PVRs), solid state devices, quantum storage devices, gaming consoles, gaming media, or any other suitable fixed or removable storage devices, and/or any combination of the same. The storage 408 may be used to store various types of content described herein as well as media device data described above. For example, the storage 408 may be used to store the output volume adjustment profiles described in FIG. 2. Nonvolatile memory may also be used (e.g., to launch a boot-up routine and other instructions). Cloud-based storage, described in relation to FIG. 5, may be used to supplement the storage 408 or instead of the storage 408.

The control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. The control circuitry 404 may also include scaler circuitry for upconverting and downconverting content into the preferred output format of the user equipment device 400. The circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general-purpose or specialized processors. Multiple tuners may be provided to handle simultaneous tuning functions (e.g., watch and record functions, picture-in-picture (PIP) functions, multiple-tuner recording, etc.). If the storage 408 is provided as a separate device from the user equipment device 400, the tuning and encoding circuitry (including multiple tuners) may be associated with the storage 408.

A user may send instructions to the control circuitry 404 using the user input interface 410. The user input interface 410 may be any suitable user interface, such as a remote control, mouse, trackball, keypad, keyboard, touchscreen, touchpad, stylus input, joystick, voice recognition interface, or other user input interfaces. The display 412 may be provided as a stand-alone device or integrated with other elements of each one of the user equipment device 400 and the user equipment system 401. For example, the display 412 may be a touchscreen or touch-sensitive display. In such circumstances, the user input interface 410 may be integrated with or combined with display 412. The display 412 may be one or more of a monitor, a television, a display for a mobile device, or any other type of display. A video card or graphics card may generate the output to the display 412. The video card may be any processing circuitry described above in relation to the control circuitry 404. The video card may be integrated with the control circuitry 404. Speakers 414 may be provided as integrated with other elements of each one of the user equipment device 400 and the user equipment system 401 or may be stand-alone units. The audio component of videos and other content displayed on the display 412 may be played through the speakers 414. In some embodiments, the audio may be distributed to a receiver (not shown), which processes and outputs the audio via speakers 414.

The media device may be implemented using any suitable architecture. For example, it may be a stand-alone application wholly implemented on each one of the user equipment device 400 and the user equipment system 401. In such an approach, instructions of the application are stored locally (e.g., in the storage 408), and data for use by the application is downloaded on a periodic basis (e.g., from an out-of-band feed, from an Internet resource, or using another suitable approach). The control circuitry 404 may retrieve instructions of the application from the storage 408 and process the instructions to rearrange the segments as discussed. Based on the processed instructions, the control circuitry 404 may determine what action to perform when input is received from the user input interface 410. For example, movement of a cursor on a display up/down may be indicated by the processed instructions when the user input interface 410 indicates that an up/down button was selected.

In some embodiments, the media device is a client/server-based application. Data for use by a thick or thin client implemented on each one of the user equipment device 400 and the user equipment system 401 is retrieved on demand by issuing requests to a server remote to each one of the user equipment device 400 and the user equipment system 401. In one example of a client/server-based guidance application, the control circuitry 404 runs a web browser that interprets web pages provided by a remote server. For example, the remote server may store the instructions for the application in a storage device. The remote server may process the stored instructions using circuitry (e.g., the control circuitry 404) and to modify a stored relationship status based on a relationship and user feedback and to perform actions automatically that control the playing of the content as discussed. In some embodiments, the remote server may process the stored instructions using circuitry (e.g., the control circuitry 404) based a change in the number of users in the proximity of the media device. For example, a second user entering the proximity and similarly leaving the proximity.

In some embodiments, the media device is downloaded and interpreted or otherwise run by an interpreter or virtual machine (run by the control circuitry 404). In some embodiments, the media device may be encoded in the ETV Binary Interchange Format (EBIF), received by the control circuitry 404 as part of a suitable feed, and interpreted by a user agent running on the control circuitry 404. For example, the media device may be an EBIF application. In some embodiments, the media device may be defined by a series of JAVA-based files that are received and run by a local virtual machine or other suitable middleware executed by control circuitry 404. In some of such embodiments (e.g., those employing MPEG-2 or other digital media encoding schemes), the media device may be, for example, encoded and transmitted in an MPEG-2 object carousel with the MPEG audio and video packets of a program.

Figure 5:
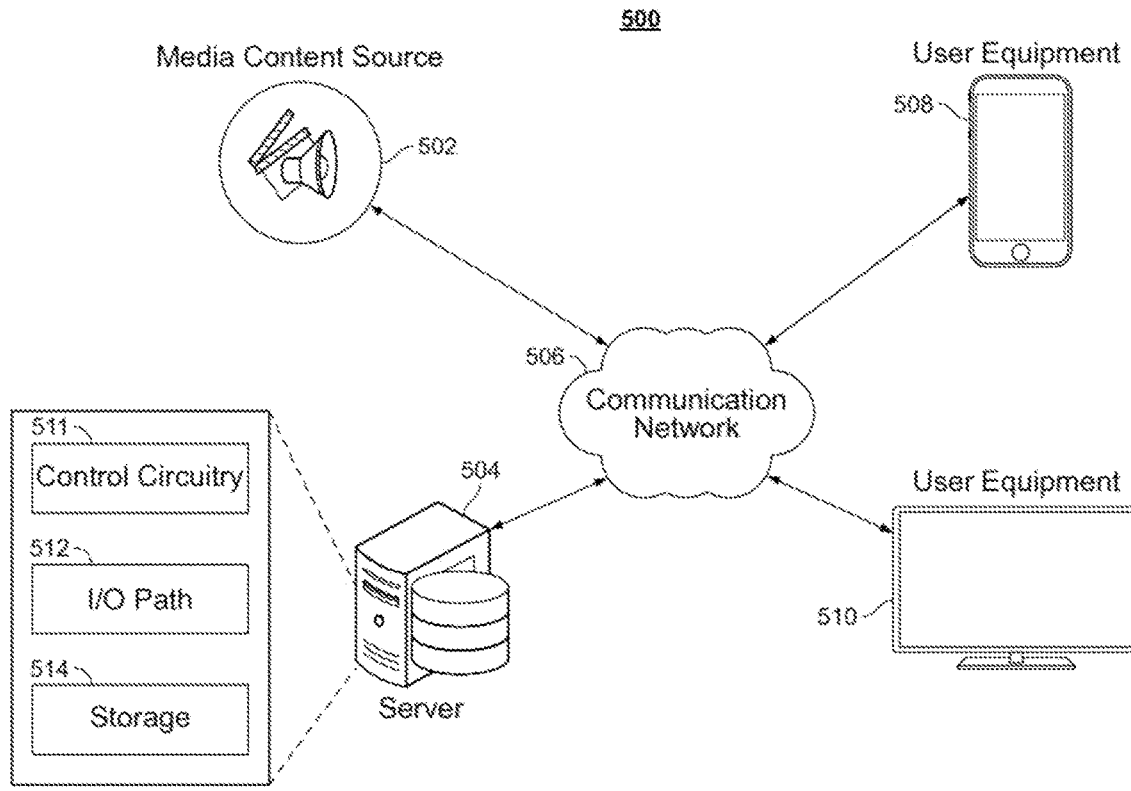
FIG. 5 depicts exemplary systems and servers and related hardware for modifying a stored relationship status based on a relationship and user feedback and thereafter automatically performing actions that control the playing of certain content, in accordance with some embodiments of the present disclosure.

FIG. 5 describes exemplary systems and servers, and related hardware for modifying a stored relationship status based on a relationship and user feedback and automatically performing actions that control the playing of the content, in accordance with some embodiments of the present disclosure. User equipment devices 508 and 510 (such as the computing device 106) may be coupled to communication network 506. The communication network 506 may be one or more networks including the Internet, a mobile phone network, mobile voice or data network (e.g., a 4G or LTE network), cable network, public switched telephone network, or other types of communication network or combinations of communication networks. Paths (e.g., depicted as arrows connecting the respective devices to the communication network 506) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 5 to avoid overcomplicating the drawing.

Although communications paths are not drawn between user equipment devices, these devices may communicate directly with each other via communications paths such as short-range communication paths, point-to-point communications paths, such as USB cables, IEEE 1394 cables, wireless paths (e.g., Bluetooth, infrared, IEEE 802-11x, etc.), or other short-range communication via wired or wireless paths. The user equipment devices may also communicate with each other directly through an indirect path via the communication network 506.

The system 500 includes a media content source 502 and a server 504. Communications with the media content source 502 and the server 504 may be exchanged over one or more communications paths but are shown as a single path in FIG. 5 to avoid overcomplicating the drawing. In addition, there may be more than one of each of the media content source 502 and the server 504, but only one of each is shown in FIG. 5 to avoid overcomplicating the drawing. If desired, the media content source 502 and the server 504 may be integrated as one source device.

In some embodiments, the server 504 may include control circuitry 511 and a storage 514 (e.g., RAM, ROM, hard disk, removable disk, etc.). The server 504 may also include an input/output path 512. The I/O path 512 may provide device information, or other data, over a local area network (LAN) or wide area network (WAN), and/or other content and data to the control circuitry 511, which includes processing circuitry, and the storage 514. The control circuitry 511 may be used to send and receive commands, requests, and other suitable data using the I/O path 512. The I/O path 512 may connect the control circuitry 511 (and specifically processing circuitry) to one or more communications paths.

The control circuitry 511 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 511 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 511 executes instructions for an emulation system application stored in memory (e.g., the storage 514). Memory may be an electronic storage device provided as the storage 514 that is part of the control circuitry 511.

The server 504 may retrieve guidance data from media content source 502, process the data as will be described in detail below, and forward the data to the user equipment devices 508 and 510. The media content source 502 may include one or more types of content distribution equipment including an audio distribution facility, a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 502 may be the originator of content (e.g., a television broadcaster, a Webcast provider, etc.) or may not be the originator of content (e.g., an on-demand content provider, an Internet provider of content of broadcast programs for downloading, etc.). The media content source 502 may include cable sources, satellite providers, on-demand providers, Internet providers, over-the-top content providers, or other providers of content. The media content source 502 may also include a remote media server used to store different types of content (including video content selected by a user) in a location remote from any of the client devices.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 504), which may be located centrally or at distributed locations, that provide cloud-based services to various types of users and devices connected via a network (such as the Internet) via communication network 506. In such embodiments, user equipment devices may operate in a peer-to-peer manner without communicating with a central server.

Figure 6:
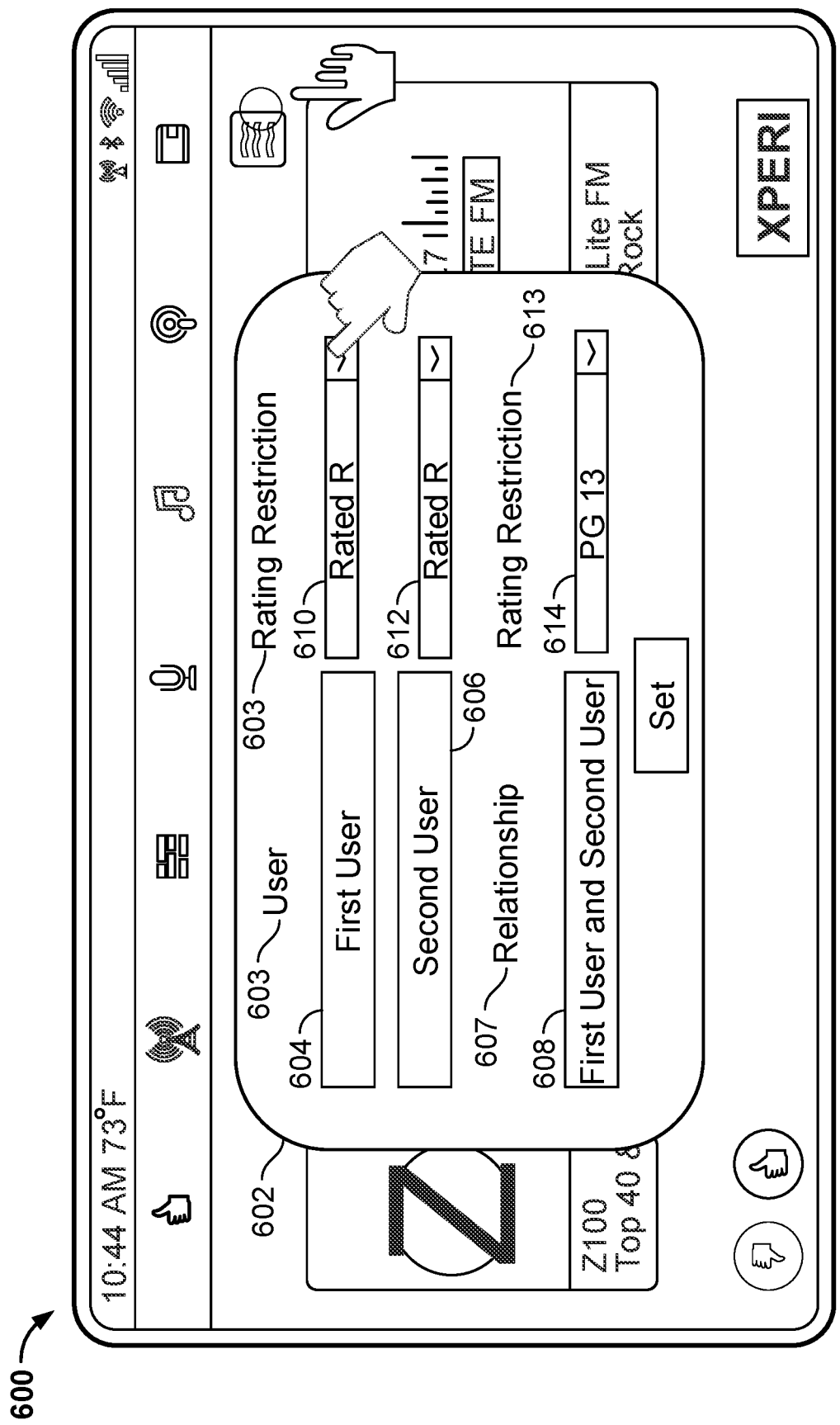
FIG. 6 depicts an illustrative example of a content interface application from a media device for manually modifying a stored relationship status based on user feedback and automatically performing actions that control the playing of certain content, in accordance with some embodiments of the present disclosure.

FIG. 6 depicts an illustrative example of a content interface application from a media device for manually entering a stored relationship status based on user feedback and automatically performing actions that control the playing of the content, in accordance with some embodiments of the present disclosure. In some embodiments, the content interface application may be launched on demand or when a user enters a new relationship. For example, the on-demand application is activated when a new user enters the proximity of the media device, and it prompts for user feedback. In another embodiment, the user relationships are entered by the user manually. In some embodiments, the system may enter a new rule based on the confidence observed, as discussed above. The content interface application 600 may include illustrative device display 602 for inputting the desired relationship policy. The content interface application 600 may include a smartphone or other suitable user device configured to receive and send a policy inputted by an authorized user (e.g., first user, second user). As illustrated, device display 602 shows an option for selecting individual parental control for each user from a list of potential users as well as an authorization based on a plurality of users. The list may be accessed from storage in the database or manually entered. For example, an authorized user may manually enter a relationship policy for each relationship between two or more users. As illustrated, device display 602 shows an option for selecting a first user 604 from a list of potential users as well as options for a parental control restriction 610 from a list of potential ratings and categories of the content. For example, the rating may be NC, R, PG-13, PG, G and categories include adult themes, adult activity, hard language, intense or persistent violence, sexually oriented nudity, drug abuse or other elements or a combination thereof. In some embodiments, the system may provide the manual entry based on one of the authorization control restrictions or content type. Similarly, the device further shows an option for selecting a second user 606 and a second authorization level 612 associated with the second user.

The device further shows an option for selecting a relationship 608 based option, which includes two or more users (e.g., first user and second user) from a list of potential users, and the list may be accessed from storage in the database or manually entered. In some embodiments, the device further includes options for an authorization control restriction 614 associated with the relationship 608 from a list of restrictions that may be based on a rating or a category. For example, the rating may be NC, R, PG-13, PG, G and categories include adult themes, adult activity, hard language, intense or persistent violence, sexually oriented nudity, drug abuse or other elements or a combination thereof.

List of potential users 603, as illustrated, includes a contact list, coworkers and family members stored in the memory of device 600. A list of potential relationships 607 includes two or more users selected from list of potential users 603. A list of potential relationships 607, as illustrated, includes a vertical list with a scroll bar for navigating the list. The list of potential relationships 607 is updated and observed for patterns based on the social link, and an age difference that may be employed for updating system behavior with additional users.

Figure 7:
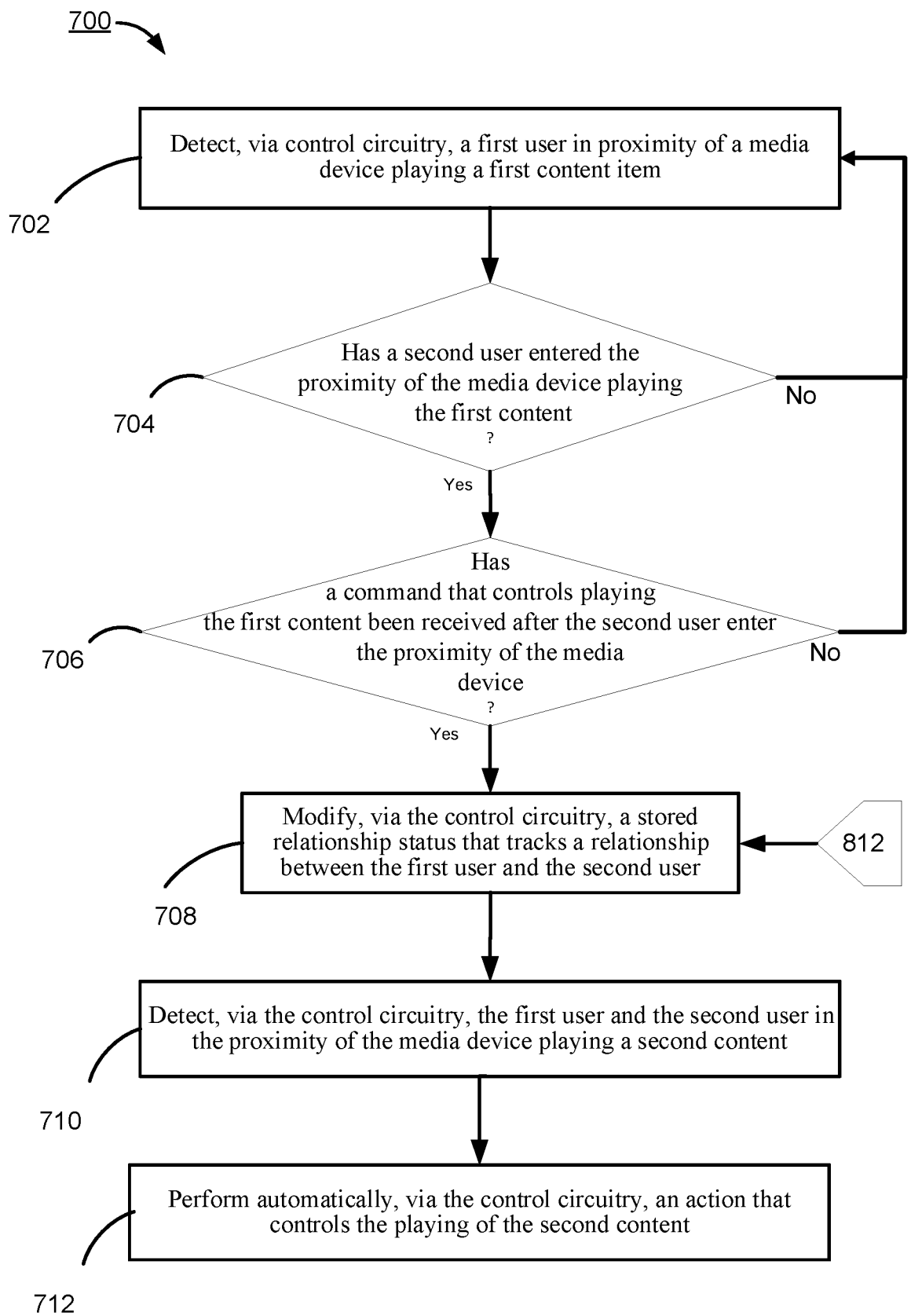
FIG. 7 is a flowchart of a detailed illustrative process for modifying a stored relationship status based on a relationship and user feedback and automatically performing actions that control the playing of certain content, in accordance with some embodiments of the present disclosure.

FIG. 7 is a flowchart of a detailed illustrative process for modifying a stored relationship status based on a relationship and user feedback and automatically performing actions that control the playing of the content, in accordance with some embodiments of the present disclosure. The process 700 may be executed by the control circuitry 404 (e.g., in a manner instructed to the control circuitry 404 by the media device). The control circuitry 404 may be part of user equipment (e.g., a device that may have any or all of the functionality of the user equipment devices 508 or 510) or of a remote server separated from the user equipment by way of the communication network 506, or distributed over a combination of both. It should be noted that the process 700, or any step thereof, could be performed on, or provided by, any of the devices shown in FIGS. 1 and 4-5.

The process 700 begins at step 702, when the control circuitry (e.g., of device 508 and/or 510) detects, via a computing device (e.g., the user equipment device 400 or the user television equipment system 401) a first user in proximity (e.g., the media device proximity 108), of the media device playing the first content.

At step 704, the media device (e.g., via the control circuitry 404) detects a second user entering the proximity of the media device playing the first content. For example, the control circuitry 404 may process signals from camera 420 to detect users in the proximity of the media device. In some embodiments, the media device (e.g., via the control circuitry 404) may detect a change in the number of users in the proximity of the media device. For example, the media device may determine if a user enters or leaves the proximity of the media device. If the control circuitry 404 determines that a second user has not entered the proximity of the media device ("No" at 704), the process 700 may return back to 702 and continue to detect the first user in the proximity of the media device playing the first content. Otherwise, if the control circuitry 404 detects a second user entering the proximity of the media device playing the first content ("Yes" at 704), the process 700 may proceed to step 706.

At step 706, the media device (e.g., via the control circuitry 404), receives a command that controls playing the first content after the second user enters the proximity of the media device, for example, to lower the volume of the media device playing the first content, or change a channel of the media device playing the first content. If the control circuitry 404 does not receive a command that controls playing the first content, after the second user enters the proximity of the media device ("No" at 706), the process 700 may return to 702 and continue to monitor the proximity of the media device playing the first content. Otherwise, if the control circuitry 404 receives a command that controls playing the first content after the second user enters the proximity of the media device ("Yes" at 706), the process 700 may proceed to step 708.

In some embodiments, the media device (e.g., via the control circuitry 404) determines if the command that controls playing the first content was received within a predetermined time from the user entering the proximity of the media device. For example, the control circuitry 404 may determine whether the command that controls playing the first content is within the predetermined time to determine if the command that controls playing the first content is related to the second user entering the proximity of the media device. If the control circuitry 404 determines that the command that controls playing the first content was not received within the predetermined time from the second user entering the proximity of the media device, the process 700 may return to 702 and continue to monitor the proximity of the media device. Otherwise, if the control circuitry 404 determines that the command that controls playing the first content was received within the predetermined time from the second user entering the proximity of the media device, the process 700 may proceed to step 708.

In some embodiments, instead of receiving a command, the media device may identify a user action that indicates disengagement from the playing of the first content. For example, the user actions that indicate disengagement may be any one or more of turning a user's face away from the media device, focusing on a second media device, leaving the room (e.g., leaving the proximity of the media device) or any combination thereof. In some embodiments, the media device may receive a user action that indicates disengagement from the playing of the first content.

At step 708, the media device (e.g., via the control circuitry 404) modifies a stored relationship status that tracks a relationship between the first user and the second user based on the received command. For example, the stored relationship status is updated with a command that controls playing the first content to change the channel every time both users are in the proximity of the media device and the new content matches the restrictions of the first content. For example, the control circuitry 404 updates the stored relationship status in a storage (e.g., the storage 408), based on a command that controls playing the first content (e.g., by overwriting the previously stored relationship status). The media device may determine a different command each time the second user enters the proximity of the media device. In some embodiments, based on the number of repeat commands (e.g., same command on two events), a confidence score is applied to the command, such a change in output volume adjustment values corresponding to the detected change in the number of users.

At step 710, the media device (e.g., via the control circuitry 404) detects the first user and the second user in the proximity of the media device playing a second content. For example, the media device may detect the first user and the second user in the proximity of the media device playing a second content. In some embodiments, the second content item may be rated similarly to the first content item.

At step 712, the media device automatically performs an action (e.g., via the control circuitry 404) that controls the playing of the second content. For example, the media device decreases the output volume level based on the command received on the first content. In another example, the media device may change the channel similar to the command received on the first content. In some embodiments, the media device may perform an action that is different than the received command, for example, inserting an advertisement into the presentation of the content during a segment that triggered the rating. In another example, the media device may search for the content (e.g., movie) from a database server that is formatted to be a lower authorization restriction and may automatically replace the higher restricted content (e.g., R-rated) with the lower restricted content (e.g., Rated PG).

Figure 8:
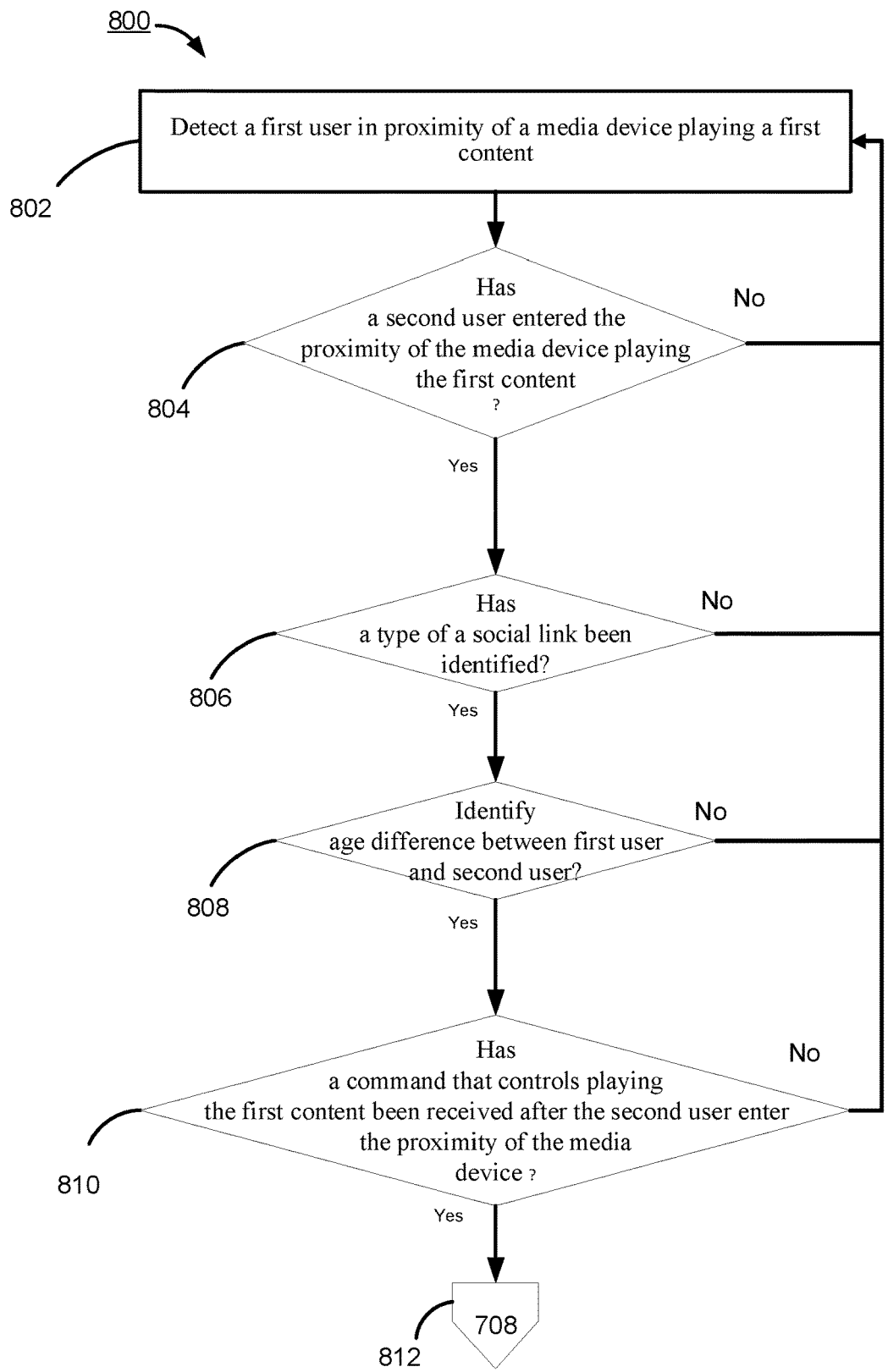
FIG. 8 is a flowchart of a detailed illustrative process for identifying the relationship for the stored relationship status based on multiple users in the proximity of the media device, in accordance with some embodiments of the present disclosure.

FIG. 8 is a flowchart of a detailed illustrative process for identifying the relationship for the stored relationship status based on multiple users in the proximity of the media device, in accordance with some embodiments of the present disclosure. Process 800 is one embodiment of a method for identifying a relationship between a first user and a second user of FIG. 7. Process 800 begins at step 802, when the media device (e.g., via the control circuitry 404) detects, via a computing device (e.g., the user equipment device 400 or the user television equipment system 401) a first user in proximity (e.g., the media device proximity 108), of the media device playing the first content. For example, the control circuitry 404 may process signals from the camera 420 to identify users in the media presentation environment (e.g., using facial recognition techniques). For example, the control circuitry 404 may compare captured images of the users in the proximity of the media device to images stored in user profiles. In some embodiments, if the control circuitry 404 is unable to identify users in the proximity of the media device, the control circuitry may automatically create a user profile for one or more of the users or prompt one or more of the users to create a user profile.

At step 804, similar to step 704, the media device (e.g., via the control circuitry 404) detects a second user entering the proximity of the media device playing the first content. For example, the control circuitry 404 may process signals from the camera 420 or via a mobile device associated with the second user coming into Bluetooth range to detect users in the proximity of the media device. If the control circuitry 404 determines that a second user has not entered the proximity of the media device ("No" at 804), the process 800 may return back to 802 and continue to monitor the first user in the proximity of the media device playing the first content. Otherwise, if the control circuitry 404 detects a second user entering the proximity of the media device playing the first content ("Yes" at 804), the process 800 may proceed to step 806. In some embodiments, if the control circuitry 404 is unable to identify additional users in the proximity of the media device, the control circuitry may automatically create a user profile for one or more of the users or prompt one or more of the users to create a user profile, or may search for the one or more of the users using social media to determine if the user belongs in a restricted group (e.g., sisters, brothers, coworkers, grandparents, etc.). For example, the second user may be similar to another user that has a user profile and a relationship restriction with the first user. Based on identifying the second user as belonging to the restricted group, the system may apply similar actions that control the playing of content on the media device.

At step 806, the media device (e.g., via the control circuitry 404), identifies a type of a social link between the first user and the second user. The device determines based on the respective user's profiles the type of a social link. For example, the type of a social link may include a parent, a sibling, a grandparent, a cousin, an uncle, an aunt, a child, a friend, and a coworker. If the control circuitry 404 identifies no type of a social link between the first user and the second user ("No" at 806), the process 800 may return to 802 and continue to detect the first user in the proximity of the media device playing the first content. Otherwise, if the control circuitry 404 identifies a type of a social link between the first user and the second user ("Yes" at 806), the process 800 may proceed to step 808.

At step 808, the media device (e.g., via the control circuitry 404) identifies an age difference between the first user and the second user. The device determines, based on the respective users' profiles, the age difference. In some embodiments, different types of social links may have additional age-difference criteria. For example, an age-difference criterion for a coworker of greater than 5 years may trigger monitoring of commands received. On the other hand, an age difference criterion for a cousin of greater than 15 years may trigger command monitoring. The age difference may be manually set or a default value. If the control circuitry 404 identifies no age difference or no age difference greater than the age difference criteria for that type of social link between the first user and the second user ("No" at 808), the process 800 may return to 802 and continue to detect the first user in the proximity of the media device playing the first content. Otherwise, if the control circuitry 404 identifies an age difference or an age difference greater than the age difference criterion for that type of social link between the first user and the second user ("Yes" at 808), the process 800 may proceed to step 810.

At step 810, the media device (e.g., via the control circuitry 404) receives a command that controls playing the first content after the second user enters the proximity of the media device, for example, the first user enters a command to lower the volume of the media device playing the first content, or change a channel of the media device playing the first content. If the control circuitry 404 does not receive a command that controls playing the first content after the second user enters the proximity of the media device ("No" at 810), the process 800 may return to 802 and continue to detect the first user in the proximity of the media device playing the first content. Otherwise, if the control circuitry 404 receives a command that controls playing the first content after the second user enters the proximity of the media device ("Yes" at 810), the process 800 may proceed to step 812, in particular, to step 708 of FIG. 7.

Figure 9:
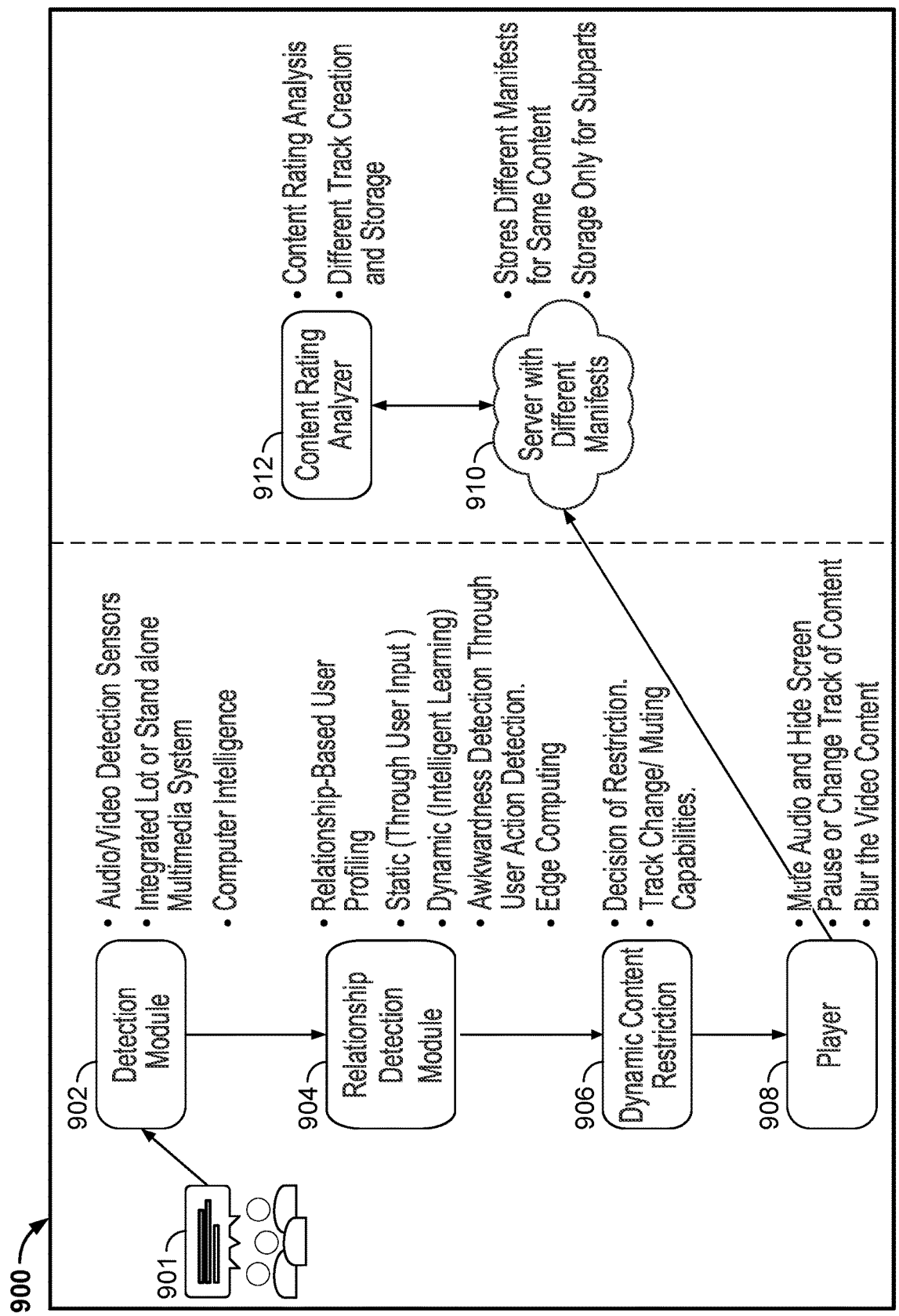
FIG. 9 depicts exemplary devices and related hardware for modifying a stored relationship status based on a relationship and user feedback and automatically performing actions that control the playing of the content, in accordance with some embodiments of the present disclosure.

FIG. 9 describes exemplary devices and related hardware for modifying a stored relationship status based on a relationship and user feedback and automatically performing actions that control the playing of the content, in accordance with some embodiments of the present disclosure. As shown in FIG. 9, the exemplary system includes a multiple user relationship 901, a detection module 902, a relationship detection module 904, a dynamic content restriction 906, a player 908, a server with different manifests 910 and a content rating analyzer 912. The multiple user relationship 901 includes more than one user and is unique to each individual users. For example, a first user and second user will have a relationship.

In some embodiments, the detection module 902 is configured with audio and video detections sensors or any other form of detection sensors configured to detect the user (e.g., first user and second user) in the room (e.g., the proximity of media device). The detection module 902 may be a part of multimedia system or some integrated Internet of Things (IoT) system, where the integrated Things are embedded with sensors, software, and other technologies to connect and exchange data with other devices and systems over the Internet and through computer intelligence. Computer-based vision techniques coupled to the camera systems can be used to detect exact users.

In some embodiments, the relationship detections module 904 is configured to construct profiles and relationships of different individuals. For example, the relationship detection module 904 may determine the social link between the first user and the second user. In some embodiments, the relationship detections module 904 may be configured as part of a static system, where the user input updates the system. In another example, the relationship detections module 904 may be configured as part of an intelligent system that adapts and updates its actions dynamically through intelligent learning. The relationship detections module 904 may be configured to detect user commands compelled by awkwardness.

In some embodiments, dynamic content restriction 906 is configured to make decisions based on the relationship graph formed after detecting multiple users. For example, dynamic content restriction 906 communicates with all the modules to determine if multiple users are present and if a relationship exists based on user feedback. In one example, the system detects a father consuming explicit content, and suddenly detects that a child enters the room where the father is consuming explicit content. In response to detecting the second user (e.g., child), the dynamic content restriction 906 automatically performs a control action on the media device to mute/stop/substitute the content being consumed.

In some embodiments, media device (player) 908 is configured to interact with the dynamic content restriction 906. The media device (player) 908 is configured to mute the content/blur the content/substitute the content on detection of any explicit level which the first user may be uncomfortable in consuming with the second user (e.g., child) present.

In some embodiments, a server with different manifest 910 is accessed to retrieve content that is suitable to a reduce restriction level based on a relationship (grandchild to grandma).

In some embodiments, the content rating analyzer 912 is configured to perform a content rating analysis. For example, the content rating analyzer 912 is an intelligent module which assigns explicitness levels to all segments of the content (e.g., scenes of a movie). These explicitness levels can be attached as a metadata to each frame or to whole segments. Based on the explicitness level, the relationship-based multiple user restrictions may apply control actions to specific scenes rather than the entire movie. In some embodiments, multiple versions of a content may be retrieved from the server based on explicitness level, a parental restriction level or some other level. In some embodiments, a higher restriction level (e.g., R-rated) version of a movie may need to be substituted with a reduced restriction level (e.g., rated PG-13) version of a movie based on a relationship to avoid awkwardness.

Figure 10:
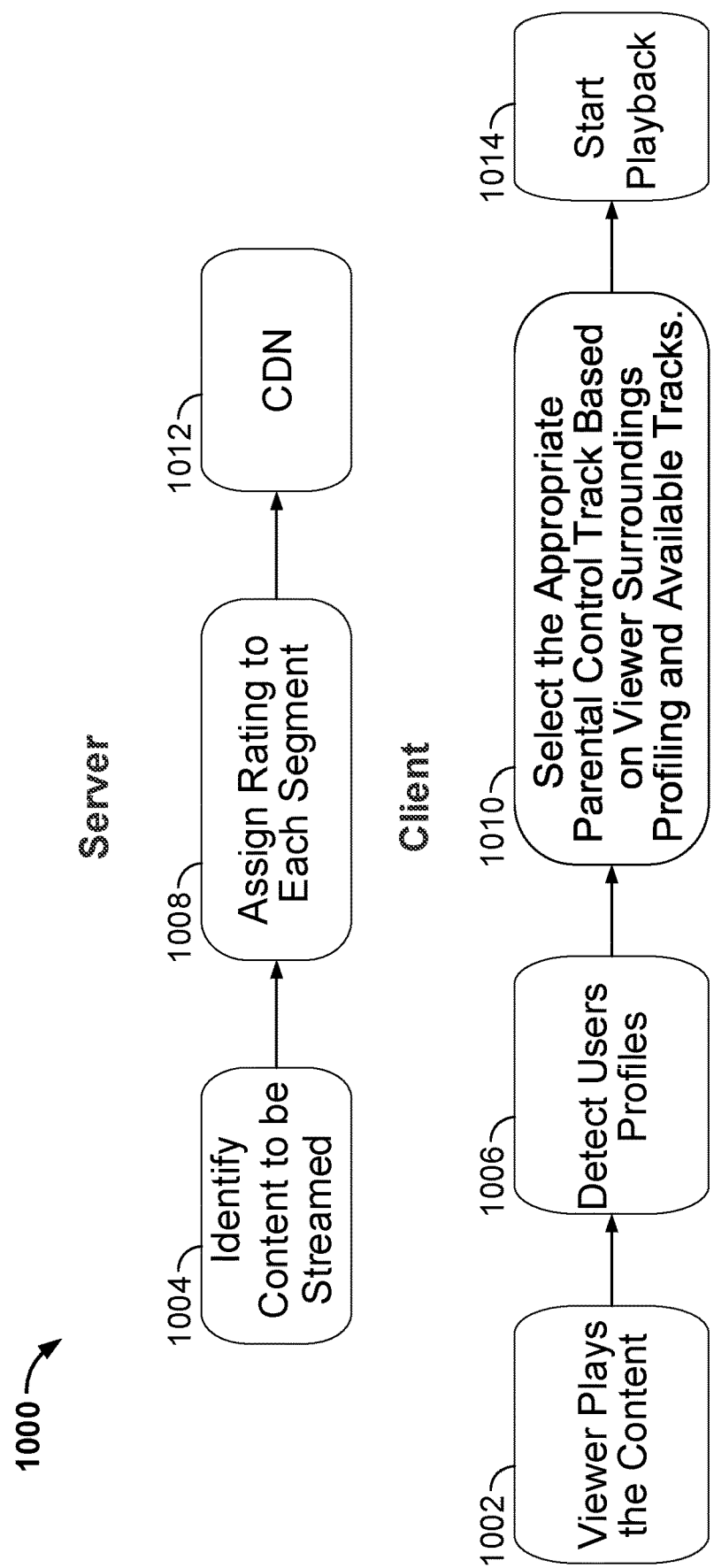
FIG. 10 depicts an exemplary process for modifying a stored relationship status based on a relationship and user feedback and automatically performing actions that control the playing of the content, in accordance with some embodiments of the present disclosure.

FIG. 10 describes an exemplary process for modifying a stored relationship status based on a relationship and user feedback and automatically performing actions that control the playing of the content, in accordance with some embodiments of the present disclosure. As shown in FIG. 10, the exemplary process includes the following steps: viewer plays the content 1002 at the user equipment, identify content to be streamed 1004 at the server, detect users' profiles 1006 at the user equipment, assign ratings to each segment 1008 of the content at the server, select the appropriate parental control track based on viewers surroundings profiling and available tracks 1010 at the user equipment, content is delivered via Content Delivery Network (CDN) 1012 at the server and content start playback 1014 at the user equipment. The steps, as illustrated in FIG. 10 are described in more detail in connection with FIGS. 7 and 8 above.

The process 1000 may be executed by the control circuitry 404 (e.g., in a manner instructed to the control circuitry 404 by the media device). The control circuitry 404 may be part of user equipment (e.g., a device that may have any or all of the functionality of the user equipment devices 508 or 510) or of a remote server separated from the user equipment by way of the communication network 506, or distributed over a combination of both. It should be noted that the process 1000, or any step thereof, could be performed on, or provided by, any of the devices shown in FIGS. 1 and 4-5. It should also be noted that the process 1000, or any step thereof, may be substituted and replaced by any of the other process steps discussed in the application.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to or used in accordance with other systems and/or methods.

What is claimed is:

1. A method comprising:
   detecting a first user in proximity of a media device playing a first content;
   detecting a second user entering the proximity of the media device playing the first content;
   receiving a command that controls playing the first content, after the second user entering the proximity of the media device;
   in response to the receiving the command that controls the playing the first content after the second user enters the proximity of the media device, modifying a stored relationship status that tracks a relationship between the first user and the second user;
   detecting the first user and the second user in the proximity of the media device playing a second content;
   in response to the detecting the first user and the second user in the proximity of the media device playing the second content, automatically performing an action that controls the playing of the second content, wherein the action is selected based on the stored relationship status that tracks the relationship between the first user and the second user;
   determining a third user with a similar relationship with the first user as the second user entering the proximity of the media device playing the first content;
   identifying a pattern in the stored relationship status between the first user and the second user based on the receiving the command that controls playing the first content between the first user and the second user;
   modifying a stored relationship status that tracks the relationship between the first user and the third user based on the receiving the command that controls playing the first content between the first user and the second user;
   detecting the first user and the third user in the proximity of the media device playing the first content; and
   in response to the detecting the first user and the third user in the proximity of the media device playing the first content, automatically performing the command that controls the playing of the second content, wherein the command is selected based on the stored relationship status that tracks the relationship between the first user and the third user.

2. The method of claim 1, wherein performing the action that controls the playing of the second content comprises performing the command that controls playing the first content.

3. The method of claim 2, wherein performing the action that controls the playing of the second content is not performed when just one user of the first user and the second user is in the proximity of the media device, but is performed when both users of the first user and the second user are detected in the proximity of the media device.

4. The method of claim 1, wherein performing the action that controls the playing of the second content comprises performing the action without receiving the command from the first user to perform the command.

5. The method of claim 1, wherein the modifying the stored relationship status between the first user and the second user comprises:
retrieving an existing relationship data between the first user and the second user based on a first user profile associated with the first user and a second user profile associated with the second user;
identifying a type of a social link between the first user and the second user based on the respective user profile, wherein the type of the social link comprises one or more of a parent, a sibling, a grandparent, a cousin, an uncle, an aunt, a child, a friend, and a coworker;
identifying an age difference between the first user and the second user based on the respective user profile; and
in response to identifying the type of the social link and the age difference, modifying the existing relationship data based on the type of the social link and the action that controls playing the first content.

6. The method of claim 1, wherein the action that controls playing the second content comprises one or more of muting a volume of the media device playing the first content, lowering volume of the media device playing the first content, or changing a channel of the media device playing the first content.

7. The method of claim 1, further comprising:
identifying a user action that indicates disengagement from the playing of the first content, wherein the user action that indicates disengagement from the playing of the first content comprises one or more of the first user leaving the proximity of the media device playing the first content, or the first user engaging with a second device or the first user looking away from the media device playing the first content for an extended period; and
in response to the identifying the user action that indicates disengagement from the playing of the first content after the second user enters the proximity of the media device, modifying the stored relationship status that tracks the relationship between the first user and the second user.

8. The method of claim 1, wherein the receiving the command that controls playing the first content, after the second user entering the proximity of the media device, comprises receiving the command that controls playing the first content within a threshold time period of the second user entering the proximity of the media device.

9. The method of claim 1, wherein the detecting the second user entering the proximity of the media device playing the first content comprises one or more of determining a location of a mobile device associated with the respective user, performing a camera scan using facial recognition, listening to a voice using voice recognition.

10. The method of claim 1, further comprises:
detecting an additional user entering the proximity of the media device;
identifying the command that controls playing the first content performed by the first user in response to the additional user entering the proximity of the media device; and
in response to the identifying the command that controls the playing the first content after the additional user enters the proximity of the media device, modifying a stored relationship status that tracks the relationship between the first user, the second user and the additional user.

11. A system comprising
detection circuitry configured to:
detect a first user in the proximity of a media device playing a first content;
detect a second user entering the proximity of the media device playing the first content;
control circuitry configured to:
receive, via the control circuitry, a command that controls playing the first content, after the second user entering the proximity of the media device;
in response to the received command that controls the playing the first content after the second user enters the proximity of the media device, modify, via the control circuitry, a stored relationship status that tracks a relationship between the first user and the second user;
detect, with the detection circuitry, the first user and the second user in the proximity of the media device playing a second content;
in response to the detecting the first user and the second user in the proximity of the media device playing the second content, perform automatically, via the control circuitry, an action that controls the playing of the second content, wherein the action is selected based on the stored relationship status that tracks the relationship between the first user and the second user;
determine a third user with a similar relationship with the first user as the second user entering the proximity of the media device playing the first content;
identify a pattern in the stored relationship status between the first user and the second user based on the receiving the command that controls playing the first content between the first user and the second user;
modify a stored relationship status that tracks the relationship between the first user and the third user based on the receiving the command that controls playing the first content between the first user and the second user;
detect the first user and the third user in the proximity of the media device playing the first content; and
in response to the detecting the first user and the third user in the proximity of the media device playing the first content, automatically perform the command that controls the playing of the second content, wherein the command is selected based on the stored relationship status that tracks the relationship between the first user and the third user.

12. The system of claim 11, wherein when performing the action that controls the playing of the second content, the control circuitry is further configured to perform the command that controls playing the first content.

13. The system of claim 12, wherein the control circuitry is further configured to not perform the action that controls the playing of the second content when just one user of the first user and the second user is in the proximity of the media device, but is performed when both users of the first user and the second user are detected in the proximity of the media device.

14. The system of claim 11, wherein when performing the action that controls the playing of the second content, the control circuitry is further configured to perform the action without receiving the command from the first user to perform the command.

15. The system of claim 11, wherein when modifying the stored relationship status between the first user and the second user the control circuitry is further configured to:
    retrieve an existing relationship data between the first user and the second user based on a first user profile associated with the first user and a second user profile associated with the second user;
    identify a type of a social link between the first user and the second user based on the respective user profile, wherein the type of the social link comprises one or more of a parent, a sibling, a grandparent, a cousin, an uncle, an aunt, a child, a friend, and a coworker;
    identify an age difference between the first user and the second user based on the respective user profile; and
    in response to identifying the type of the social link and the age difference, modify the existing relationship data based on the type of the social link and the action that controls playing the first content.

16. The system of claim 11, wherein the action that controls playing the second content comprises one or more of muting a volume of the media device playing the first content, lowering volume of the media device playing the first content, changing a channel of the media device playing the first content.

17. The system of claim 11, wherein the control circuitry is further configured to:
    identify a user action that indicates disengagement from the playing of the first content, wherein the user action that indicates disengagement from the playing of the first content comprises one or more of the first user leaving the proximity of the media device playing the first content, or the first user engaging with a second device or the first user looking away from the media device playing the first content for an extended period; and
    in response to the identifying the user action that indicates disengagement from the playing of the first content after the second user enters the proximity of the media device, modify the stored relationship status that tracks the relationship between the first user and the second user.

18. The system of claim 11, wherein when the receiving the command that controls playing the first content, after the second user entering the proximity of the media device, wherein the control circuitry is further configured to receive the command that controls playing the first content within a threshold time period of the second user entering the proximity of the media device.

19. The system of claim 11, wherein when the receiving the command that controls playing the first content, after the second user entering the proximity of the media device, wherein the control circuitry is further configured to receive the command that controls playing the first content within a threshold time period of the second user entering the proximity of the media device.

\* \* \* \* \*